United States Patent Office 2,812,772
Patented Nov. 12, 1957

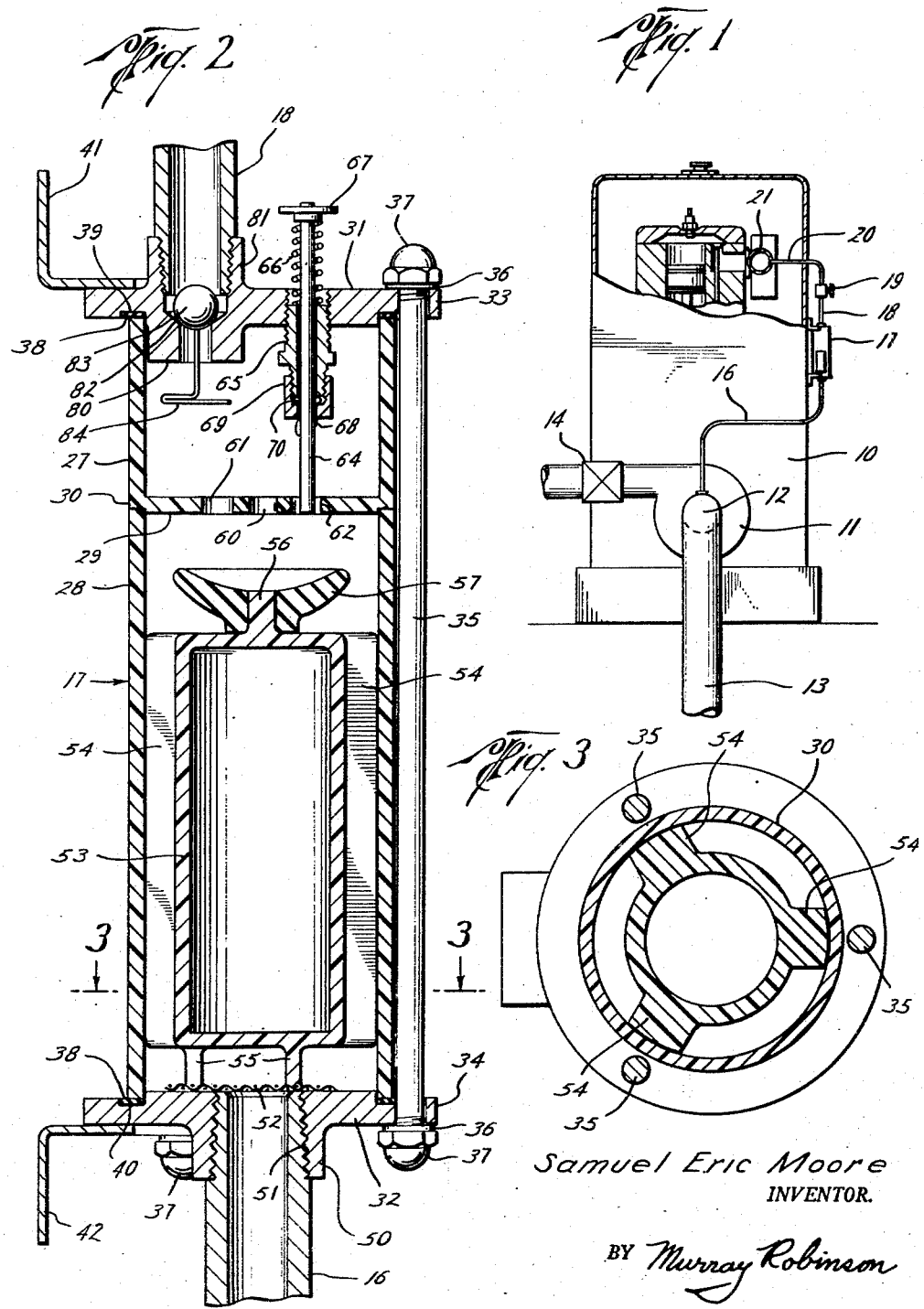

2,812,772

FLOW CONTROL DEVICE

Samuel Eric Moore, Bellaire, Tex.

Application May 1, 1956, Serial No. 581,908

1 Claim. (Cl. 137—202)

This invention pertains to pump primers and more particularly to a flow control device to be placed in a line connecting the intake of a centrifugal pump with the intake of an engine driving the pump whereby the pump intake can be evacuated by the suction of the engine until liquid has risen under atmospheric pressure into the pump sufficiently high to be acted on by the pump and thereafter further rise of the liquid into the engine is prevented.

The object of the invention is to provide such a flow control device which will be safe to use, reliable in operation, inexpensive to manufacture, and easy to maintain.

Other objects and advantages of the invention will become apparent from the following description of a preferred embodiment of the invention, reference being made to the accompanying drawings wherein:

Figure 1 is an end view, partly in section, of an engine and pump assembly including a priming arrangement incorporating a flow control device according to the invention;

Figure 2 is a vertical section through the flow control device; and

Figure 3 is a section on line 3—3 of Figure 2.

Referring now to Figure 1, there is shown an engine 10 driving a centrifugal pump 11 whose intake 12 is connected to pipe 13 leading to a body of water or other liquid to be lifted or moved. The pump discharges through a check valve 14 which prevents flow of air into the pump discharge during priming.

The pump intake 12 is connected by pipe 16 to flow control device 17 which is connected by pipe 18, manual valve 19 and pipe 20 to the engine intake manifold 21. Valve 19 is a safety device to be used in case the automatic flow control device 17 should not operate, being essential to prevent water or other material being pumped from entering the engine.

Referring now to Figure 2, the flow control device 17 comprises a transparent hollow cylinder made up of the upper tube portion of cup 27 and lower tube 28 and divided into upper and lower chambers by a partition formed by disc 29 constituting the bottom of cup 27. Cup 27 has an annular rabbet 30 around its lower periphery equal in width to the thickness of the walls of tube 28 whereby the cup 27 nests in the top of the tube 28.

The cylinder is closed at its upper end by metal plug 31 and at its lower end by a similar plug 32. The flanges 33, 34 of the plugs extend beyond the outer periphery of the cylinder whereby they can be drawn together by three bolts (see also Figure 3) 35 having washers 36 and nuts 37 at their ends. Gaskets 38 seal between the ends of the cylinder and annular grooves 39, 40 in the plugs. Brackets 41, 42 are secured to the plugs for mounting the device on the side of engine 10 above the pump intake 12 and below the engine intake manifold 21.

Plug 32 is provided with a boss 50 having a threaded hole 51 therein into which is screwed the threaded end of pipe 16, thus providing means for admitting fluid (such as air or water) to the interior of the device. A screen 52 over hole 51 prevents entrance of large solid particles.

Within tube 28 is a hollow opaque plastic float 53 having flutes 54 on the sides thereof fitting loosely within tube 28, whereby the float is slidably mounted inside the tube. The lower end of the float has a plurality of pins or feet 55 azimuthally spaced therearound, providing means to keep the float from closing the inlet provided by hole 51. A central pin 56 on the top of the float fixedly engages an aperture in a synthetic rubber cup 57 which forms a valve member actuated by the float 53.

Partition 29 is provided with one or more centrally disposed apertures such as central hole 60 and adjacent holes 61, 62 azimuthally spaced therearound, all of which are covered over by cup 57 when it is up against the partition. The portion of partition 29 outside the holes 60, 61, 62 thus forms a valve seat.

To enable the valve formed by cup 57 and partition 29 to be positively opened manually an operating rod 64 is axially slidably mounted in plug 31 in a bearing 65 screwed into the plug. A helical spring 66 concentrically disposed on rod 64 bears against the upper end of the plug and against a push button 67 secured to the upper end of the plug so as to bias the rod to its uppermost position as determined by abutment of wire pin 68 (passed through a hole in rod 64) with gland nut 69 screwed into the lower end of bearing 65. An O ring 70 between nut 69 and bearing 65 seals between the rod 64 and bearing 65. By pushing down on button 67 the rod 64 is extended down through one of the holes (e. g. hole 62) in partition 29 and against cup 57 to open the valve.

Plug 31 is provided with internal and external bosses 80, 81 which are bored and tapped to provide an outlet passage into which pipe 18 is screwed and also a seat 82 for a ball check valve 83 to which is fastened a retainer wire 84.

In operation, when it is desired to start pump 11 the engine 10 is started and valve 19 opened. The engine intake then lowers the pressure in the pump intake 12 by drawing air up through pipe 16, flow control device 17, pipe 18, valve 19 and pipe 20 into the intake manifold 21. The liquid then rises into the pump. When the centrifugal pump 11 is about half full of liquid it begins to discharge through check valve 14. Shortly thereafter the liquid rises through pipe 16 into the lower chamber of flow control device 17 where it lifts float 53 until the valve cup 52 closes over the openings 60, 61, 62 in the partition 29 and prevents further rise of the liquid. The closing of the float valve will be apparent to the operator through the transparent walls of the tubes 27, 28 and the operator may then close valve 19. If the operator does not close valve 19, check valve 83 assures that air will not be diverted from the engine when the pump intake pressure lowers below that of the engine as the pump fills up and becomes fully operative.

While a preferred embodiment of the invention has been shown and described, many modifications thereof can be made by one skilled in the art without departing from the spirit thereof and it is desired to protect by Letters Patent all forms of the invention falling within the scope of the following claim.

I claim:

A flow control device comprising a pair of coaxial transparent tubes, a disc disposed between the adjacent ends of the tubes and integrally connected to the lower end of the upper tube and nesting within the upper end of the lower tube, said disc having a plurality of apertures therethrough, a float in the lower tube having a valve adapted to close the apertures in said disc, a pair of plugs closing the other ends of said tubes, each plug having an aperture therethrough adapted to be connected to a flow line, each plug having an annular flange extending radially beyond the end of the tube, and bolts through said flanges holding said plugs, tubes and disc assembled whereby said device can be readily disassembled for cleaning or repair, said float comprising a hollow plastic cylinder having a pin on its upper end, the valve comprising a rubber cup having a central aperture disposed over said pin, said plastic cylinder having a plurality of pins at its lower end to prevent the lower end of the plastic cylinder from covering the aperture in the lower plug, said lower aperture being covered with a wire screen to prevent entrance of large solid particles.

References Cited in the file of this patent

UNITED STATES PATENTS

| | | |
|---|---|---|
| 233,199 | Bott | Oct. 12, 1880 |
| 318,083 | Brennan | May 19, 1885 |
| 1,173,620 | Thompson | Feb. 29, 1916 |
| 1,551,362 | Barton | Aug. 25, 1925 |
| 1,619,356 | Martin | Mar. 1, 1927 |

FOREIGN PATENTS

| | | |
|---|---|---|
| 416,329 | France | Aug. 4, 1910 |